(12) United States Patent
Gupta et al.

(10) Patent No.: US 12,395,203 B2
(45) Date of Patent: Aug. 19, 2025

(54) SYSTEM AND DESIGN METHOD OF HIGH SPEED TRANSCEIVER BOARD (HSTB) OF A MASSIVE MIMO RADIO UNIT

(71) Applicant: JIO PLATFORMS LIMITED, Ahmedabad (IN)

(72) Inventors: Deepak Gupta, Navi Mumbai (IN); Nekiram Khosya, Dombivali (IN); Amrish Bansal, Navi Mumbai (IN); Brijesh Shah, Navi Mumbai (IN); Renuka Nair, Dombivali (IN)

(73) Assignee: JIO PLATFORMS LIMITED, Ahmedabad (IN)

( * ) Notice: Subject to any disclaimer, the term of this patent is extended or adjusted under 35 U.S.C. 154(b) by 0 days.

(21) Appl. No.: 18/247,460

(22) PCT Filed: Mar. 11, 2023

(86) PCT No.: PCT/IB2023/052345
§ 371 (c)(1),
(2) Date: Mar. 31, 2023

(87) PCT Pub. No.: WO2023/187514
PCT Pub. Date: Oct. 5, 2023

(65) Prior Publication Data
US 2025/0015826 A1     Jan. 9, 2025

(30) Foreign Application Priority Data
Mar. 29, 2022 (IN) .............................. 202221018410

(51) Int. Cl.
*H04L 5/16* (2006.01)
*H04B 1/40* (2015.01)
*H04B 7/0452* (2017.01)

(52) U.S. Cl.
CPC ............. *H04B 1/40* (2013.01); *H04B 7/0452* (2013.01)

(58) Field of Classification Search
CPC .......... G05F 1/575; G05F 3/247; H02M 1/08; H04B 7/0482; H04B 1/38; H01Q 9/0414; H04Q 1/38
USPC ......................................................... 375/219
See application file for complete search history.

(56) References Cited

U.S. PATENT DOCUMENTS

| 10,911,044 | B1 * | 2/2021 | Jin ................. H03K 19/018521 |
| 2008/0161073 | A1 | 7/2008 | Park et al. |
| 2020/0091608 | A1 | 3/2020 | Alpman et al. |
| 2021/0101498 | A1 * | 4/2021 | Sugimoto ............... B60L 53/11 |
| 2021/0119474 | A1 * | 4/2021 | Knoop ................... H02H 3/087 |
| 2021/0152282 | A1 * | 5/2021 | Huang ................. H04L 1/0061 |
| 2021/0397207 | A1 | 12/2021 | Joo et al. |

(Continued)

FOREIGN PATENT DOCUMENTS

CN          110447146 A     11/2019

OTHER PUBLICATIONS

International Search Report, PCT/IB2023/052345, mailed Jun. 19, 2023, Total pp. 03.

*Primary Examiner* — Khai Tran
(74) *Attorney, Agent, or Firm* — FINNEGAN, HENDERSON, FARABOW, GARRETT & DUNNER, LLP

(57) ABSTRACT

The present invention relates generally to network devices, and more particularly to design and architecture of a high speed transceiver board (HSTB) of a massive multiple-input multiple-output (MIMO) radio unit.

16 Claims, 4 Drawing Sheets

(56) References Cited

U.S. PATENT DOCUMENTS

2022/0173526 A1\* 6/2022 Da Silveira ............ H01Q 3/267
2023/0139978 A1\* 5/2023 Carobolante ........... H02M 3/07
                                                    323/234

\* cited by examiner

SYSTEM AND DESIGN METHOD OF HIGH SPEED TRANSCEIVER BOARD (HSTB) OF A MASSIVE MIMO RADIO UNIT

FIELD OF INVENTION

The present invention relates generally to network devices, and more particularly to design and architecture of a high speed transceiver board (HSTB) of a massive multiple-input multiple-output (MIMO) radio unit.

BACKGROUND OF THE INVENTION

The following description of related art is intended to provide background information pertaining to the field of the disclosure. This section may include certain aspects of the art that may be related to various features of the present disclosure. However, it should be appreciated that this section be used only to enhance the understanding of the reader with respect to the present disclosure, and not as admissions of prior art.

The 5G communication system is considered to be implemented in sub 6 Ghz and higher frequency (millimeter (mm) Wave) bands, e.g., 60 gigahertz (GHz) bands, so as to accomplish higher data rates. To decrease propagation loss of the radio waves and increase the transmission distance, beam forming, massive multiple-input multiple-output (MIMO), Full Dimensional MIMO (FD-MIMO), array antenna, analog beam forming, and large scale antenna techniques are discussed for use in 5G communication systems.

MIMO, (multiple-input, multiple-output) is a radio antenna technology that deploys one or more antennas at both the transmitter and receiver ends to increase the quality, throughput, and capacity of the radio link. MIMO uses techniques known as spatial diversity and spatial multiplexing to transmit independent and separately encoded data signals, known as "streams", reusing the same time period and frequency resource.

MIMO is used in many modern wireless and RF technologies, including Wi-Fi and Long-Term Evolution (LTE). 3GPP first specified MIMO for LTE in 2008 in its Release 8, which variant used two transmitters and two receivers, 2×2 MIMO, and subsequent enhancement in processing power has enabled use of more simultaneous data streams in wireless networks with current 4G LTE networks using 4×4 MIMO. The very short wavelengths at mm Wave frequencies result in smaller antenna dimensions and for 5G NR. 3GPP has specified 32 antennas (32×32 MIMO). This expansion in the size of MIMO antenna has led to the term Massive MIMO.

Massive MIMO is based on three key concepts of spatial diversity, spatial multiplexing, and beam forming. While existing disclosures pertaining to design/architecture of Massive MIMO Radio Units (MRUs) make the overall device very costly, high on power consumption, thermally inefficient, bulky and requires interoperability and coupling with various separate/currently independent/non-conformant, and cabled components such as antenna components and transceiver elements which complicates the overall design and construction. There is therefore a need for a MRU that can integrate all these components together efficiently, and accordingly offer a cost-effective solution where an integrated antenna filter unit (AFU) is used and which blind mates with RF Front End board, making it a cable-less design.

SUMMARY

In an aspect, the present disclosure relates to a high-speed transceiver board (HSTB). The HSTB may include a plurality of transceivers that provide lower L1 layer processing. The HSTB may further include a digital front end section. The HSTB may be configured to receive an external predefined input direct current (DC) voltage and down convert the received external predefined input DC voltage to a plurality of lower voltages based on requirements from different devices on board.

In an embodiment, any or a combination of power management integrated chipset (PMIC), DC-DC converters, and linear and low-dropout (LDO) regulators devices may generate the plurality of lower voltages.

In an embodiment, an antenna filter unit (AFU) may be operatively coupled with the HSTB to facilitate beam forming to multiple users.

In an embodiment, a Radio Frequency (RF) Front End Module (RFEM) may be operatively coupled with the HSTB to receive RF control signals from the HSTB, and process said received RF control signals through one or more gain blocks and power amplifiers to amplify the received RF control signals across one or more of a plurality of transmit and receive chains to generate power from each chain.

In an embodiment, each of the plurality of transceivers may be configured with a plurality of RF chains for processing control signal and power.

In an embodiment, the plurality of chains for processing control signal and power may be blind mated DC wise and RF wise to the RFEM to remove complexity of cable routing and avoid RF signal oscillations.

In an embodiment, one transceiver among the plurality of transceivers may be configured to receive digital data/signals from a combined centralized and distributed unit (CCDU) through a predefined interface, and transmit the received digital data/signals to the remaining plurality of transceivers.

In an embodiment, the remaining plurality of transceivers may be configured to act as digital frontend to process high speed RF signals through Analog-to-Digital (ADC) converters and Digital-to-Analog (DAC) converters and convert the transmitted digital data/signals into the high speed RF signals across each set of the plurality of RF chains associated with each of the remaining plurality of transceivers.

In another embodiment, the HSTB may be configured to power an RF board.

In another embodiment, the HSTB may include a clock synchronization unit configured for synchronization.

In another embodiment, the clock synchronization unit may include any or a combination of ultra-low noise clock generation phase locked loop (PLL), a programmable oscillator, and a system synchronizer.

In an embodiment, the HSTB may include at least one of digital high-speed signals, switching power supplies, clock section and radio frequency signal designed on a plurality of layers in a Printed Circuit Board (PCB).

In an embodiment, the plurality of layers in the PCB comprises routing channels to route RF signals and aurora signals running on high speed on adjacent layers.

In an aspect, the present disclosure relates to a user equipment communicatively coupled with the HSTB. The user equipment may be configured to receive a connection request from the HSTB, send an acknowledgement of the connection request to the HSTB, and in response, transmit a plurality of signals.

In an aspect, the present disclosure relates to a communication method that may be performed by a user equipment (UE) communicatively coupled with a high speed transceiver board (HSTB).

In an aspect, the present disclosure relates to a non-transitory computer readable medium including processor-executable instructions that cause a processor to receive a connection request from a high speed transceiver board HSTB, send an acknowledgment of the connection request to the HSTB, and in response, transmit a plurality of signals, where the HSTB includes a plurality of transceivers, where the plurality of transceivers provide lower L1 layer processing, a digital front end section, where the HSTB is configured to receive an external predefined input direct current (DC) voltage, and down convert the received external predefined input DC voltage to a plurality of lower voltages based on requirements from different devices on board.

OBJECTS OF THE INVENTION

An object of the present invention is to provide higher spectral efficiency by allowing its antenna array to focus narrow beams towards a user.

An object of the present invention is to provide higher energy efficiency system as the antenna array is focused in a small specific section, it requires less radiated power and reduces the energy requirement in massive MIMO systems.

An object of the present invention is to increase the data rate and capacity of wireless systems.

An object of the present invention is to facilitate more reliable and accurate user tracking.

An object of the present invention is to eliminate high Power Consumption.

An object of the present invention is to reduce the Latency and increases the reliability of the network.

An object of the present invention is to provide a cable less design of Massive MIMO radio unit.

An object of the present invention is provide a Massive MIMO standalone unit placed in a single convection cooled enclosure and weighing less than 25-29 kg.

An object of the present invention is to provide a Massive MIMO standalone unit that comprises of lower layer PHY section, ORAN compliant Fronthaul on 25G optical interface, Digital Front End support for 32 transmit and receive chains using commercial grade three FPGAs.

An object of the present invention is to provide a Massive MIMO standalone unit that includes IEEE 1588v2 PTP based Clock synchronization architecture on 25G optical interface using system synchronizer IC and clock generators.

An object of the present invention is to provide a high-speed transceiver board (HSTB) configured to receive external −48V input DC voltage and down convert it to various lower voltages (such as to 12V and then 12V to 5V and 1V among other combinations as desired) based on requirements from different devices on board.

BRIEF DESCRIPTION OF DRAWINGS

The accompanying drawings, which are incorporated herein, and constitute a part of this invention, illustrate exemplary embodiments of the disclosed methods and systems in which like reference numerals refer to the same parts throughout the different drawings. Components in the drawings are not necessarily to scale, emphasis instead being placed upon clearly illustrating the principles of the present invention. Some drawings may indicate the components using block diagrams and may not represent the internal circuitry of each component. It will be appreciated by those skilled in the art that invention of such drawings includes the invention of electrical components, electronic components or circuitry commonly used to implement such components.

Figure 1:
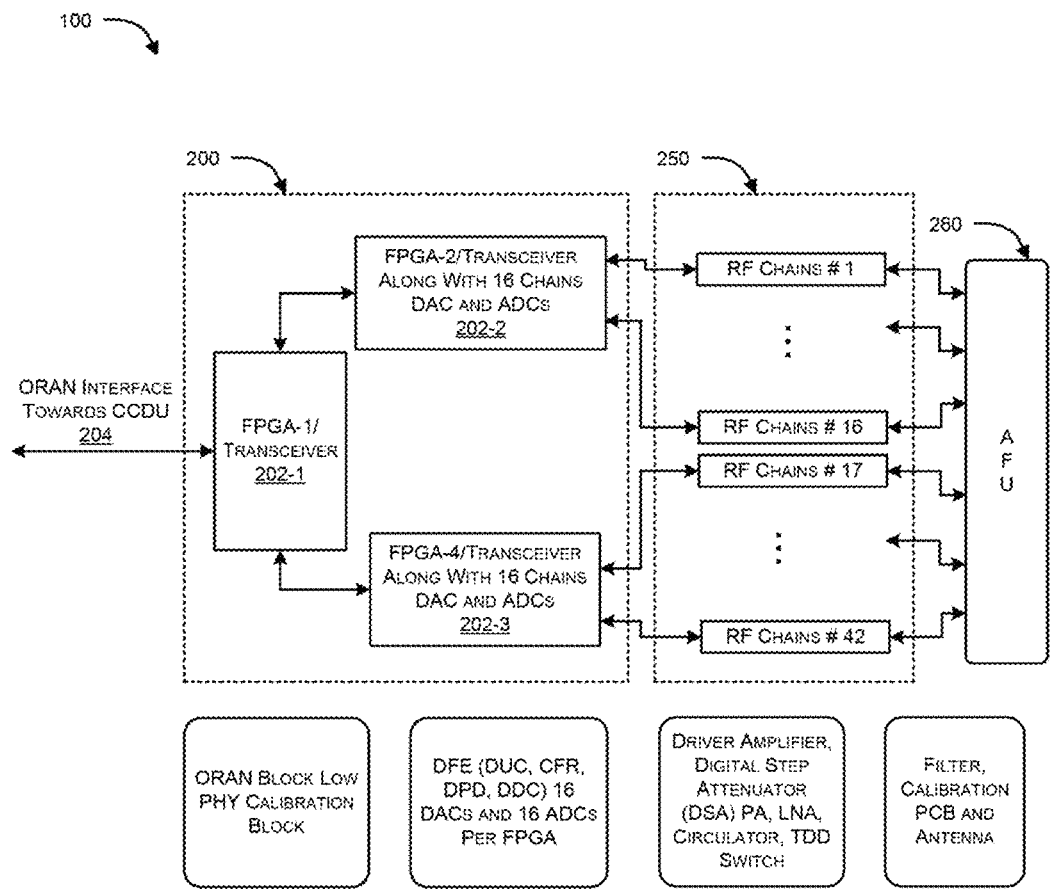
FIG. 1 illustrates an exemplary design architecture of a Massive MIMO Radio Unit in accordance with aspects of the present disclosure.

The foregoing shall be more apparent from the following more detailed description of the invention.

DETAILED DESCRIPTION OF INVENTION

In the following description, for the purposes of explanation, various specific details are set forth in order to provide a thorough understanding of embodiments of the present disclosure. It will be apparent, however, that embodiments of the present disclosure may be practiced without these specific details. Several features described hereafter can each be used independently of one another or with any combination of other features. An individual feature may not address all of the problems discussed above or might address only some of the problems discussed above. Some of the problems discussed above might not be fully addressed by any of the features described herein.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed but could have additional steps not included in a figure. A process may correspond to a method, a function, a procedure, a subroutine, a subprogram, etc. When a process corresponds to a function, its termination can correspond to a return of the function to the calling function or the main function.

The word "exemplary" and/or "demonstrative" is used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, such terms are intended to be inclusive—in a manner similar to the term "comprising" as an open transition word-without precluding any additional or other elements.

Reference throughout this specification to "one embodiment" or "an embodiment" or "an instance" or "one instance" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

In the disclosure, various embodiments are described using terms used in some communication standards (e.g., 3rd generation partnership project (3GPP), extensible radio access network (xRAN), and open-radio access network (O-RAN)), but these are merely examples for description. Various embodiments of the disclosure may also be easily modified and applied to other communication systems.

Typically, a base station is a network infrastructure that provides wireless access to one or more terminals. The base station has coverage defined to be a predetermined geographic area based on the distance over which a signal may be transmitted. The base station may be referred to as, in addition to "base station," "access point (AP)," "evolved NodeB (eNodeB) (eNB)," "5G node (5th generation node)," "next generation NodeB (gNB)," "wireless point," "transmission/reception point (TRP)," or other terms having equivalent technical meanings.

The present disclosure relates to an ORAN compliant 5G Massive MIMO Radio Unit (MRU) (alternatively and interchangeably also referred to as "5G MRU" or "RU" hereinafter). In an exemplary and non-limiting embodiment, the present disclosure provides a hardware architecture and design of a multiple antenna configuration 32T32R based 5G Massive MIMO Radio Unit (MRU) for standalone mode, wherein the proposed 5G MRU is a radio unit (RU) connected to a Combined Central and Distributed Unit (CCDU) on Fronthaul interface using 25G optical interface and is compliant to 3GPP (Third Generation Partnership Project) based ORAN (Open Radio Access Network) specifications. The proposed MRU can be configured in a manner such that, in an exemplary implementation, there are three cell-cites and three (3) corresponding MRUs are used with the CCDU, wherein each MRU can be connected to the CCDU through the 25G interface.

In an exemplary aspect, the proposed 5G MRU comprises a lower PHY (Physical) portion of L1 layer with network layer split of 7.2× (O-RAN Alliance fronthaul specification between O-DU to O-RRU), a baseband section, a RF (Radio Frequency) Front End module (RFEM), and an Antenna Filter Unit (AFU) as part of a single enclosure/unit for easy and efficient installation. It is however to be appreciated that design and architecture of each of the components/units of the proposed RU is novel and inventive as regards the proposed invention is concerned and hence each would be protected through a respective patent application.

In an exemplary aspect, with respect to FIG. 1, the proposed 5G MRU 100 comprises a High Speed Transceiver Board (HSTB) 200 having a lower layer PHY section, an ORAN compliant Fronthaul on 25G optical interface 204, and a digital RF front end support 250 for 32 transmit and receive chains using, for instance, commercial grade three FPGAs/transceivers (202-1 to 202-3, collectively referred to as 202 hereinafter), said elements/components being integrated on a highly dense 26 layers of the HSTB 200. It would be appreciated that while the disclosure is being explained with respect to a FPGA, any other equivalent transceiver is fully within the scope of the present disclosure, and therefore scope of each FPGA should be treated as that of any transceiver or technically equivalent component such as an ASIC.

In an exemplary aspect, the L1 lower layer PHY development and bit stream generation can be implemented/undertaken in the FPGA 202 itself. L1 higher layer can be configured on the CCDU below the tower, wherein the L2 and L3 are configured on the distributed unit, wherein a macro-site typically includes a central unit node (server side) and a distributed unit node (configured between the CU and RUs). The present invention merges the central unit node with the distributed unit node so as to form a CCDU that interfaces through the 25G optical interface with the RUs/MRUs as proposed in the instant disclosure. The proposed MRU can further include an IEEE 1588v2 PTP based clock synchronization architecture on the 25G optical interface 204 using system synchronizer IC and clock generators.

The proposed MRU 100 can further include an Integrated 8×8 MIMO antenna with 32 cavity filter as a one unit known as Antenna Filter Unit (AFU) 280. The proposed MRU 100, as configured, can be blind mated and possess a cable less design.

In an exemplary and non-limiting aspect of the present disclosure, the proposed 5G MRU 100 is a 200 W high power gNB that operates in macro class (typically 6.25 W or 38 dBm per antenna port), and is configured to provide macro-level wide-area solutions for coverage and capacity that can find utility in Dense Urban morphologies, and in hot zone/hot spot areas having high traffic and QoS demands. The proposed 5G MRU 100 brings together a lower layer PHY section, a RF transceiver based on commercial grade FPGAs for 32 transmit and receive chains (as part of the HSTB 200), a RF Front End Module (RFEM) 250 that includes RF power amplifiers, Low noise amplifiers (LNA), and RF switches for 32 chains, and an 8*8 MIMO antenna along with 32 cavity filters known as Antenna Filter Unit (AFU) 280 as part of a single convection cooled enclosure and weighing less than 25-29 kg. In an aspect, Macro gNB can provide good coverage and capacity for dense urban clutter owing to 8 beams in the downlink and 4 uplink beams support under multi-UE scenarios. The proposed 5G MRU 100 can be deployed at high rise buildings, dense clutters, and hotspot locations where traffic demand is significantly high and cannot be served by 4G gNB alone for coverage and capacity boosts.

In another aspect, the proposed 5G MRU can be configured as a design with integrated antenna and cavity filter solution without requiring use of cable, making it a cable less design. The proposed MRU 100 can be deployed in tower sites, GBTs and GBMs. The MRU can be deployed quickly so as to deliver high performance with low power consumption, making the MRU a power efficient solution. The proposed MRU can be connected to a CCDU below the tower on a single 25G optical front haul interface that is 3GPP ORAN compliant.

In an aspect, the proposed 5G MRU is a high power gNB (Next Generation Node B) that operates in macro class (typically ≤38 dBm per antenna port), and can be configured to complement macro-level wide-area solutions for coverage and capacity. In an exemplary aspect, high level architecture of the proposed 32T32R 5G NR MRU can include a High Speed Transceiver Board (HSTB) 200, a 32T32R RF Frond End Module (RFEM) Board 250, an Antenna Filter Unit (AFU) 280, and a mechanical housing (in an instance, there can be two housings, one for the HSTB 200 and one for the RFEM 250). The proposed MRU construction further facilitates and enables optimal heat dissipation owing to operation in weather conditions ranging from −10 degrees to 50 degrees C.

In an exemplary aspect, the proposed 5G NR MRU 100 brings together lower layer PHY section, RF transceiver based on commercial grade FPGAs for 32 transmit and receive chains with the RF sampling (No Intermediate Frequency stage) (as part of the HSTB 200), RF front end module (RFEM) 250 that includes RF power amplifiers, Low noise amplifiers (LNA), and RF switches for 32 chains, and 8*8 MIMO antenna along with 32 cavity filters known as Antenna Filter Unit (AFU) 280 in a single convection cooled enclosure and weighing ≤29 kg.

In an exemplary implementation, the proposed MRU 100 comprises 64 connectors, 32 on each of transmit and receive side, and two DC connectors, each connector having 25 pins, making it 50 pins across the two DC connectors. These connectors are configured on the HSTB 200 in manner such that they blindly connect/map/mate/sandwich with the RFEM board, one on top of the other.

In an aspect, the proposed design architecture comprises of a control plane, user plane, and a synchronization plane, wherein the control plane is configured to control the configuration of the units/sub-units that form part of the proposed MRU 100 from a distance-place perspective, and wherein the user plane comprises of the user data, and finally wherein the synchronization plane is configured to utilize precision time-based protocol (PTP) on the instant 25G interface so as to synchronize the unit/sub-units with respect to a global clock using a timing protocol (i.e. the slave device would sync its clock with the master device in terms of the phase and the frequency), and maintain consistency/sync with the CCDU.

It would be appreciated that the proposed MRU meets all the RF performance requirements mentioned in 3GPP standard (TS 38.141) after integrating TDD based 5G NR MRU with Crest Factor Reduction (CFR) and digital pre-distortion (DPD) modules in digital front end lineup. Furthermore, the MRU has low power consumption and thermally handled optimally by the IP65 ingress protected mechanical housing.

High Speed Transceiver Board (HSTB) 200

Figure 2:
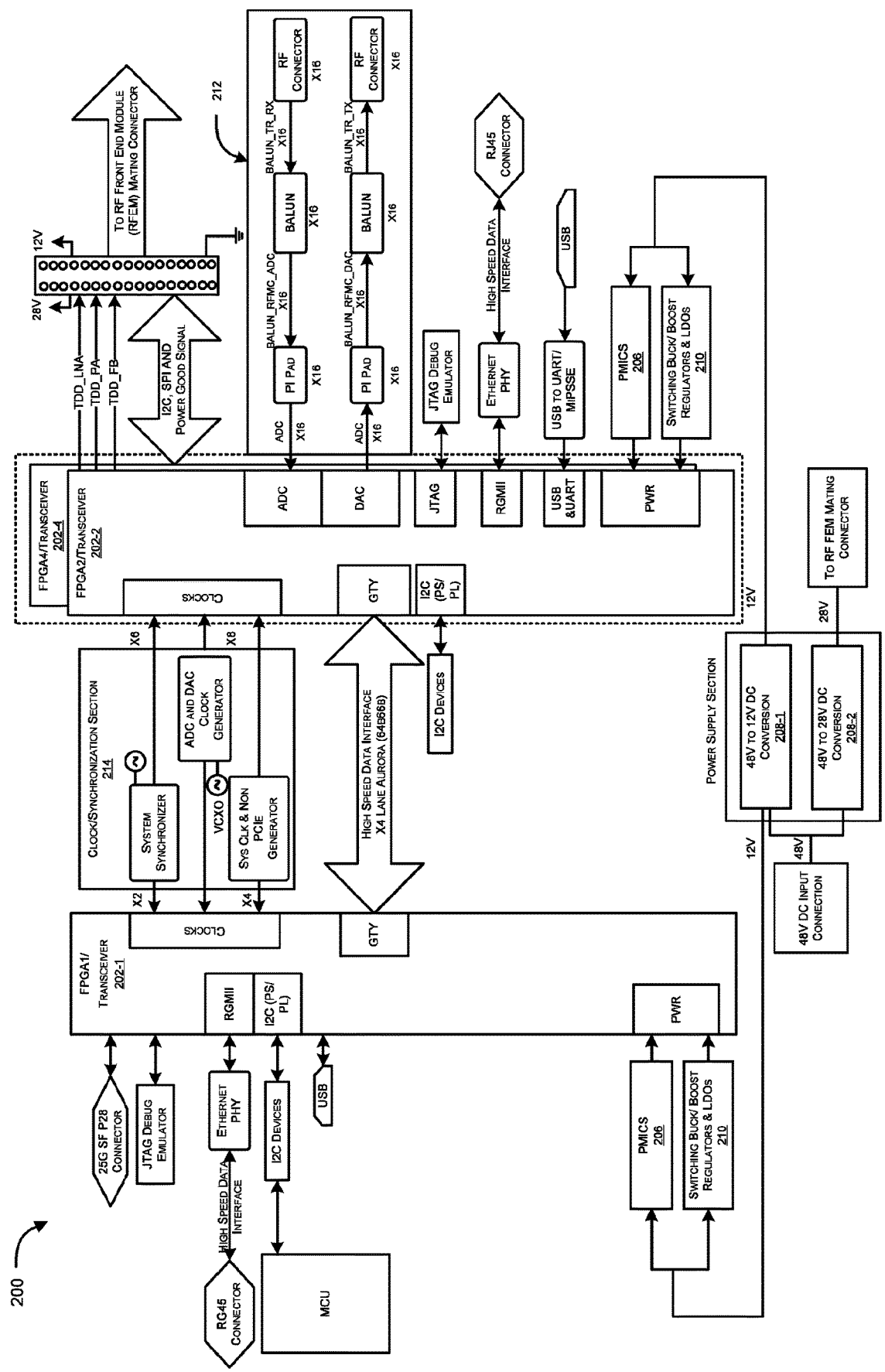
FIG. 2 illustrates an exemplary design architecture of a High Speed Transceiver Board (HSTB) in accordance with aspects of the present disclosure.

In an exemplary aspect, with reference to FIGS. 1 and 2, HSTB 200 may include three (3) FPGA chipsets 202-1, 202-2, and 202-3 for lower L1 layer processing and digital front end section. HSTB 200 may be configured to receive external −48V input DC voltage and down convert it to various lower voltages (such as to 12V and then 12V to 5V and 1V among other combinations as desired) based on requirements from different devices on board. Any or a combination of the power management integrated chipset (PMIC) 206, power supply section 208 including 208-1 and 208-2, and low dropout (LDO) regulator devices 210 may be used to generate regulated power supply.

In an embodiment, the HSTB 200 may be configured to receive the external −48V input DC voltage. The HSTB 200 may down convert the received voltage to 28V using an isolated power supply and again down convert to 12V using a non-isolated power supply.

In an exemplary implementation, the transceiver 202-1 can be configured to receive digital data/signals from the CCDU and transmitted to transceivers 202-2/202-3 which would covert the digital data into RF signals across the 32 RF chains (for instance, one transceiver can process/take care of 16 chains/control signal and power, and the second transceiver can further take care of/process 16 chains/control signal and power) (which would be blind mated DC wise as well as RF wise), which would be operatively coupled with the RF board 212. RF board 212 being a passive element gets power from the HSTB 200 in order to reduce and optimize the overall costs and derive as much power as is required from the HSTB 200 itself. In an embodiment, the power supply received by the transceiver 202-2, 202-3 may be regulated through a combination of power management integrated circuit (PMICS) 206 and a switching buck/boost regulator/LDO device 210.

In an embodiment, the RF board 212 may include multiple BALUN's for providing impedance transformation and delivering the optimal power supply during ADC and DAC conversions.

In an aspect, the complete system can be synchronized (using, for instance, a clock/synchronization section 214) within the HSTB 200 through IEEE 1588v2 based PTP on 25G Fronthaul interface 204 while running PTP client to on board synchronization circuit. The proposed circuit can include any or a combination of ultra-low noise clock generation PLLs, a programmable oscillator, and a system synchronizer. Further, the clock/synchronization section 214 may include a system synchronizer, an ADC and DAC clock generator, a system clock, and peripheral component interconnect express (PCIe) generator that provide synchronization between the clocks of the transceiver 202-1 and the transceivers 202-2, 202-3.

FIG. 2 illustrates an exemplary overall design architecture of the proposed HSTB 200 that can include sub-systems including but not limited to FPGA based RF transceivers, digital high-speed signals, switching power supplies, clock section and radio frequency signal that are designed on a 26-Layer PCB. The PCB design can include unique design techniques to route RF signals and aurora signals running on high speed 25GT/s on adjacent layers and meet design specifications.

In an aspect, the HSTB 200 can be configured to obtain, through a 25 Gigabit fiber interface (exemplary), at a transceiver (such as FPGA), data from the CCDU residing on the ODC (outdoor cabinet), and process the obtained digital data to provide RF signal(s). The other two transceivers can then be configured to act as a digital frontend so as to process the high speed RF signals through Analog-to-Digital (ADC) converters and Digital-to-Analog (DAC) converters. The analog signals would then be transmitted to the RF connectors that would blind-mate with the RFEB. Transceiver configured on the HSTB can be configured to provide a 78-Band (exemplary) RF signal for 32 chips in the transmit and 32 chips in the receive. In an exemplary aspect, size of the proposed HSTB can be around 530*360 mm and would be configured as a 26 or more layer board.

Although FIG. 2 shows exemplary components of the HSTB 200, in other embodiments, the HSTB 200 may include fewer components, different components, differently arranged components, or additional functional components than depicted in FIG. 2. Additionally, or alternatively, one or more components of the HSTB 200 may perform functions described as being performed by one or more other components of the HSTB 200.

Figure 3:
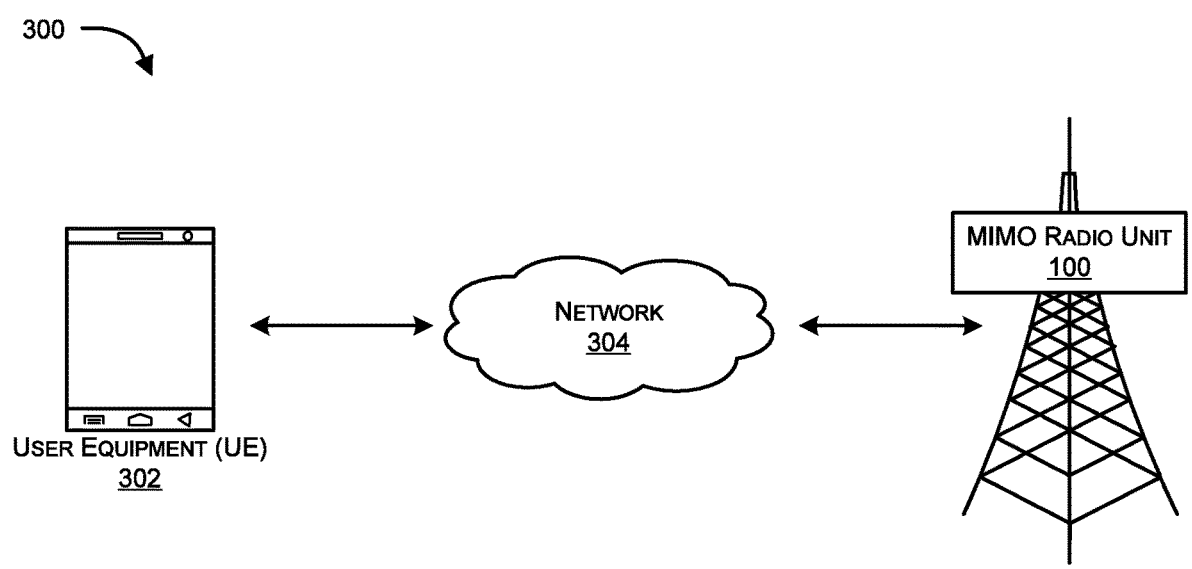
FIG. 3 illustrates an exemplary coupling representation of a user equipment (UE) with the MIMO radio unit in accordance with aspects of the present disclosure.

FIG. 3 illustrates an exemplary coupling representation of a user equipment (UE) with the MRU. As illustrated, the UE 302 may be communicatively coupled to the MRU 100. The coupling can be through a wireless network 304. In an exemplary embodiment, the communication network 304 may include, by way of example but not limitation, at least a portion of one or more networks having one or more nodes that transmit, receive, forward, generate, buffer, store, route, switch, process, or a combination thereof, etc. one or more messages, packets, signals, waves, voltage or current levels, some combination thereof, or so forth. The UE 302 can be any handheld device, mobile device, palmtop, laptop, smart phone, pager and the like. As a result of the coupling, the UE 302 may be configured to receive a connection request from the MRU 100, send an acknowledgment of connection request to the MRU 100 and further transmit a plurality of signals in response to the connection request.

Exemplary Computer System 400

Figure 4:
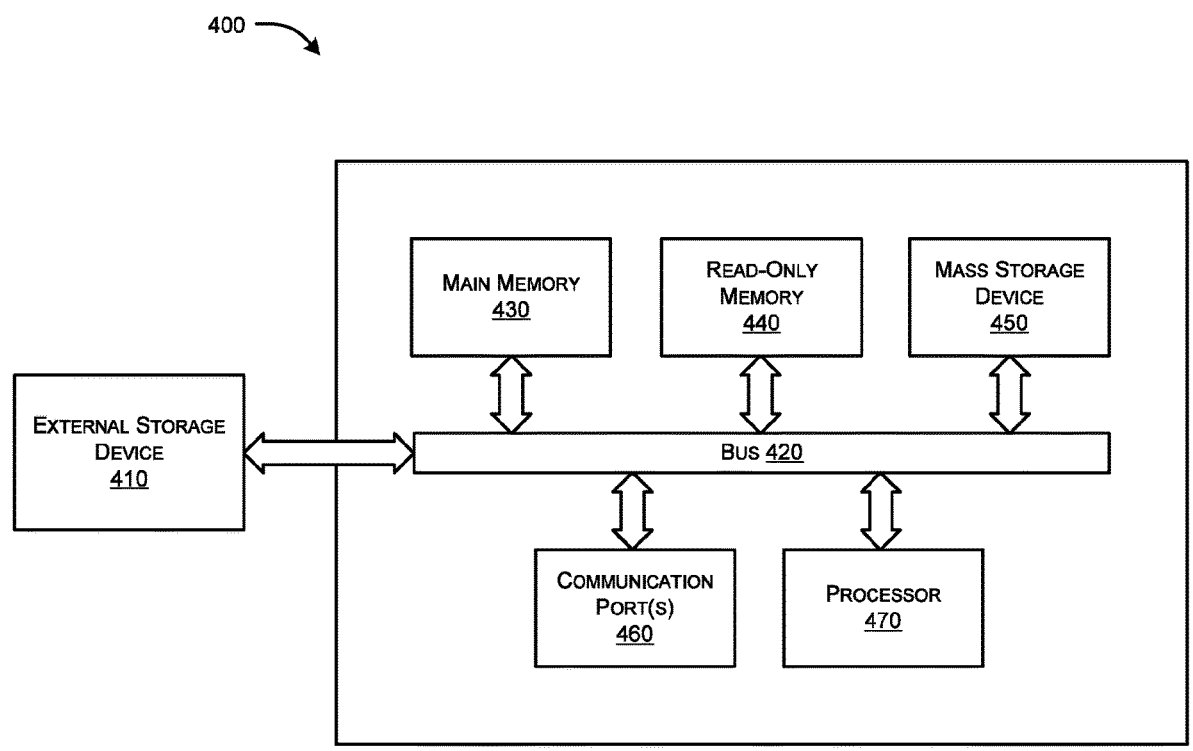
FIG. 4 illustrates an exemplary computer system in which or with which embodiments of the present invention can be utilized in accordance with embodiments of the present disclosure.

FIG. 4 illustrates an exemplary computer system in which or with which embodiments of the present invention can be utilized in accordance with embodiments of the present disclosure. As shown in FIG. 4, computer system 400 can include an external storage device 410, a bus 420, a main memory 430, a read only memory 440, a mass storage device 450, communication port 460, and a processor 470. A person skilled in the art will appreciate that the computer system may include more than one processor and communication ports. Processor 470 may include various modules associated with embodiments of the present invention. Communication port 460 can be any of an RS-232 port for use with a modem-based dialup connection, a 10/100 Ethernet port, a Gigabit or 10 Gigabit port using copper or fibre, a serial port, a parallel port, or other existing or future ports. Communication port 460 may be chosen depending on a network, such a Local Area Network (LAN), Wide Area Network (WAN), or any network to which computer system connects. Memory 430 can be Random Access Memory (RAM), or any other dynamic storage device commonly known in the art. Read-only memory 440 can be any static storage device(s). Mass storage 450 may be any current or future mass storage solution, which can be used to store information and/or instructions.

Bus 420 communicatively couples with processor(s) 470 with the other memory, storage and communication blocks.

Optionally, operator and administrative interfaces, e.g. a display, keyboard, and a cursor control device, may also be coupled to bus 420 to support direct operator interaction with a computer system. Other operator and administrative interfaces can be provided through network connections connected through communication port 460. Components described above are meant only to exemplify various possibilities. In no way should the aforementioned exemplary computer system limit the scope of the present disclosure.

In an embodiment of the present disclosure, a communication method is disclosed that may be performed by the user equipment (UE) communicatively coupled with a high speed transceiver board (HSTB) (200). The HSTB may include a plurality of transceivers that provide lower L1 layer processing. The HSTB may further include a digital front end section. The HSTB may be configured to receive an external predefined input direct current (DC) voltage and down convert the received external predefined input DC voltage to a plurality of lower voltages based on requirements from different devices on board.

While considerable emphasis has been placed herein on the preferred embodiments, it will be appreciated that many embodiments can be made and that many changes can be made in the preferred embodiments without departing from the principles of the invention. These and other changes in the preferred embodiments of the invention will be apparent to those skilled in the art from the disclosure herein, whereby it is to be distinctly understood that the foregoing descriptive matter to be implemented merely as illustrative of the invention and not as limitation.

A portion of the disclosure of this patent document contains material which is subject to intellectual property rights such as, but are not limited to, copyright, design, trademark, IC layout design, and/or trade dress protection, belonging to Jio Platforms Limited (JPL) or its affiliates (herein after referred as owner). The owner has no objection to the facsimile reproduction by anyone of the patent document or the patent disclosure, as it appears in the Patent and Trademark Office patent files or records, but otherwise reserves all rights whatsoever. All rights to such intellectual property are fully reserved by the owner.

Advantages of the Invention

The present invention provides for a radio unit with higher spectral efficiency by allowing its antenna array to focus narrow beams towards a user.

The present invention provides for a higher energy efficiency system as the antenna array is focused in a small specific section, it requires less radiated power and reduces the energy requirement in massive MIMO systems.

The present invention provides for a radio unit that increases the data rate and capacity of wireless systems.

The present invention provides for a radio unit that facilitates more reliable and accurate user tracking.

The present invention provides for a radio unit that eliminates high Power Consumption.

The present invention provides for a radio unit that reduces the Latency and increases the reliability of the network.

The present invention provides for a cable less design of Massive MIMO radio unit.

The present invention provides for a Massive MIMO standalone unit placed in a single convection cooled enclosure and weighing less than 25-29 kg.

The present invention provides for a Massive MIMO standalone unit that comprises of lower layer PHY section, ORAN compliant Fronthaul on 25G optical interface, Digital Front End support for 32 transmit and receive chains using commercial grade three FPGAs.

The present invention provides for a Massive MIMO standalone unit that includes IEEE 1588v2 PTP based Clock synchronization architecture on 25G optical interface using system synchronizer IC and clock generators.

The present invention provides for a high-speed transceiver board (HSTB) configured to receive external −48V input DC voltage and down convert it to various lower voltages (such as to 12V and then 12V to 5V and 1V among other combinations as desired) based on requirements from different devices on board.

We claim:

1. A high speed transceiver board (HSTB) (200), said HSTB (200) comprising: a plurality of transceivers (202-1, 202-2, 202-3), wherein said plurality of transceivers (202-1, 202-2, 202-3) provide lower LI layer processing; a digital front end section, wherein the HSTB (200) is configured to: receive an external predefined input direct current (DC) voltage; and down convert the received external predefined input DC voltage to a plurality of lower voltages based on requirements from different devices on the HSTB (200).

2. The HSTB (200) as claimed in claim 1, wherein any or a combination of power management integrated chipset (PMIC) (206), DC-DC converters (208), and linear and low-dropout (LDO) regulator devices (210) are configured to generate the plurality of lower voltages.

3. The HSTB (200) as claimed in claim 1, wherein the HSTB (200) is operatively coupled with an antenna filter unit (AFU) (280) to facilitate beam forming to multiple users.

4. The HSTB (200) as claimed in claim 1, wherein the HSTB (200) is operatively coupled to a Radio Frequency (RF) Front End Module (RFEM) (250) to receive RF control signals, and process said received RF control signals through one or more gain blocks (252) and power amplifiers (254) to amplify the received RF control signals across one or more of a plurality of transmit and receive chains to generate power from each chain.

5. The HSTB (200) as claimed in claim 1, wherein each of the plurality of transceivers (202-1, 202-2, 202-3) are configured with a plurality of radio frequency (RF) chains for processing control signal and power.

6. The HSTB (200) as claimed in claim 5, wherein the plurality of RF chains for processing the control signal and the power are blind mated DC wise and RF wise to a Radio Frequency (RF) Front End Module (RFEM) (250) to remove complexity of cable routing and avoid RF signal oscillations.

7. The HSTB (200) as claimed in claim 1, wherein one transceiver (202-1) among the plurality of transceivers (202-1, 202-2, 202-3) is configured to: receive digital data/signals from a combined centralized and distributed unit (CCDU) through a predefined interface; and transmit the received digital data/signals to the remaining plurality of transceivers (202-2, 202-3).

8. The HSTB (200) as claimed in claim 7, wherein the remaining plurality of transceivers (202-2, 202-3) are configured to: act as the digital front end section to process high speed radio frequency (RF) signals through Analog-to-Digital (ADC) converters and Digital-to-Analog (DAC) converters; and convert the transmitted digital data/signals into the high speed RF signals across each set of at least 16 RF chains associated with each of the remaining plurality of transceivers (202-2, 202-3).

9. The HSTB (200) as claimed in claim 1, wherein the HSTB (200) is configured to power a radio frequency (RF) board (212).

10. The HSTB (200) as claimed in claim 1, wherein the HSTB (200) comprises a clock synchronization unit (214) for synchronization.

11. The HSTB (200) as claimed in claim 10, wherein the clock synchronization unit (214) comprises any or a combination of ultra-low noise clock generation phase locked loop (PLL), a programmable oscillator, and a system synchronizer.

12. The HSTB (200) as claimed in claim 1, wherein the HSTB (200) comprises at least one of digital high-speed signals, switching power supplies, and clock section designed on a plurality of layers in a Printed Circuit Board (PCB).

13. The HSTB (200) as claimed in claim 12, wherein the plurality of layers in the PCB comprises a plurality of routing channels to route radio frequency (RF) signals and aurora signals running on high speed on adjacent layers.

14. A communication method performed by a user equipment (UE) communicatively coupled with a high speed transceiver board (HSTB) (200) as claimed in claim 1.

15. A user equipment (UE) communicatively coupled with a high speed transceiver board (HSTB) (200), said UE configured to: receive a connection request from the HSTB (200); send an acknowledgment of the connection request to the HSTB (200); and in response, transmit a plurality of signals, wherein the HSTB (200) comprises: a plurality of transceivers (202-1, 202-2, 202-3), wherein said plurality of transceivers (202-1, 202-2, 202-3) provide lower LI layer processing; a digital front end section, wherein the HSTB (200) is configured to: receive an external predefined input direct current (DC) voltage; and down convert the received external predefined input DC voltage to a plurality of lower voltages based on requirements from different devices on board.

16. A non-transitory computer readable medium comprising processor-executable instructions that cause a processor to: receive a connection request from a high speed transceiver board HSTB (200); send an acknowledgment of the connection request to the HSTB (200); and in response, transmit a plurality of signals, wherein the HSTB (200) comprises: a plurality of transceivers (202-1, 202-2, 202-3), wherein said plurality of transceivers (202-1, 202-2, 202-3) provide lower LI layer processing; a digital front end section, wherein the HSTB (200) is configured to: receive an external predefined input direct current (DC) voltage; and down convert the received external predefined input DC voltage to a plurality of lower voltages based on requirements from different devices on board.

* * * * *